US010942917B2

(12) United States Patent
Apte et al.

(10) Patent No.: US 10,942,917 B2
(45) Date of Patent: Mar. 9, 2021

(54) SYSTEM AND METHOD TO MAINTAIN REFERENTIAL INTEGRITY WHILE MASKING/MIGRATING DATA IN FLAT FILES

(71) Applicant: Syntel, Inc., Troy, MI (US)

(72) Inventors: Abhijit Anil Apte, Pune (IN); Shashank Moghe, Navi Mumbai (IN); Ravi Arunrao Kulkarni, Pune (IN); Abhijeet Prabhakar Sheth, Mumbai (IN); Jyoti Kumari, Navi Mumbai (IN); Vishesh Datwani, Mumbai (IN)

(73) Assignee: SYNTEL, INC., Troy, MI (US)

( * ) Notice: Subject to any disclaimer, the term of this patent is extended or adjusted under 35 U.S.C. 154(b) by 2 days.

(21) Appl. No.: 16/460,841

(22) Filed: Jul. 2, 2019

(65) Prior Publication Data
US 2020/0167335 A1    May 28, 2020

Related U.S. Application Data

(60) Provisional application No. 62/771,770, filed on Nov. 27, 2018.

(51) Int. Cl.
*G06F 16/23*    (2019.01)
*G06F 9/451*    (2018.01)
*G06F 16/11*    (2019.01)

(52) U.S. Cl.
CPC .......... *G06F 16/2365* (2019.01); *G06F 9/451* (2018.02); *G06F 16/119* (2019.01)

(58) Field of Classification Search
CPC .... G06F 16/2365; G06F 9/451; G06F 16/119; G06F 16/214
See application file for complete search history.

(56) References Cited

U.S. PATENT DOCUMENTS

| 6,151,608 A * | 11/2000 | Abrams ................ G06F 16/214 707/679 |
| 8,606,752 B1 | 12/2013 | Beatty et al. |
| 8,898,201 B1 | 11/2014 | Drost |
| 2004/0111726 A1 | 6/2004 | Dilley et al. |

(Continued)

FOREIGN PATENT DOCUMENTS

EP          1857946 A2    11/2007

*Primary Examiner* — Pei Yong Weng
(74) *Attorney, Agent, or Firm* — Miles & Stockbridge, P.C.

(57) ABSTRACT

A computerized system maintains referential integrity during data migration and optionally masking. The system allows the user to identify one or more flat file(s) as the data source as well as identify the data destination file(s). The system automatically identifies the referential integrity columns where column names match in different flat files, automatically identifies referential integrity by analyzing related application source code for embedded business rules that indicate referential integrity, or can allow the user to describe the referential integrity pertaining to the data source to establish user-defined referential integrity, which referential integrity definition(s) are stored in a data store (e.g., an XML File) accessible via a configuration engine. The system, through a sequence engine and subsequently an execution engine, uses the stored referential integrity and other information to migrate and optionally masks the data from the data source file(s) into the data destination file(s).

16 Claims, 6 Drawing Sheets

(56) References Cited

U.S. PATENT DOCUMENTS

| | | |
|---|---|---|
| 2010/0057759 A1 | 3/2010 | Cotichini et al. |
| 2014/0280365 A1 | 9/2014 | Krugmann et al. |
| 2017/0083604 A1* | 3/2017 | Syed-Ebrahim .... G06F 21/6227 |
| 2017/0192758 A1* | 7/2017 | Apte .................... G06F 8/51 |

* cited by examiner

US 10,942,917 B2

SYSTEM AND METHOD TO MAINTAIN REFERENTIAL INTEGRITY WHILE MASKING/MIGRATING DATA IN FLAT FILES

CROSS-REFERENCE TO RELATED APPLICATIONS

This application claims the benefit of U.S. provisional application No. 62/771,770, filed 27 Nov. 2018 (the '770 application). The '770 application is hereby incorporated by reference as though fully set forth herein.

BACKGROUND a. Technical Field

This disclosure relates generally to a system and method for data processing, and more particularly, to a system and method to maintain referential integrity while masking and/or migrating data in flat files.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Data is all pervasive. It exists in various forms, however, if one intends on making meaningful use of it, the data should be made available in a form that can provide meaningful information rather than just the raw data. In present competitive times, maintaining data is a basic necessity and extracting meaningful information from the data is of paramount importance. There are many ways to store and maintain data, such as a relational database management system (RDBMS), NO SQL (i.e., database provides a mechanism for storage and retrieval of data that is modeled in means other than the tabular relations used in relational databases), flat files, and the like.

Dealing with referential integrity while processing a flat file. A flat file does not follow any internal hierarchy. A flat file may store data in a plain text format. In other words, a flat file by its very nature contains only data records and little or no metadata is stored in the flat file itself.

For the data stored in a flat file, there is a strong need to migrate such data to a relational database or sometimes to other flat file(s) in order to make it more meaningful and useful. Also, data in a flat file might contain sensitive and/or personally identifiable information (PII) data that needs to be masked while migration in order to protect it from misuse and/or fraud.

Considering the limitations of a flat file, there is a strong possibility that during a data migration and masking process, the referential integrity of the data may get lost. It is important therefore to maintain the referential integrity of the data otherwise the migrated data may not be of practical use.

The disclosed solution effectively maintains referential integrity of the data in a flat file(s) while migrating and/or masking such data.

The foregoing discussion is intended only to illustrate the present field and should not be taken as a disavowal of claim scope.

SUMMARY

A method according to an embodiment of the instant disclosure involves defining a data source, including at least one flat file that comprises a plurality of columns and a plurality of rows. The method further involves defining a data destination comprising at least a first table and a second table. The method further involves determining a referential integrity (RI) (e.g., a definition) for and between the first and second tables, in respect of the data contained in the data source, based on at least a column name of the plurality of columns of the flat file (i.e., data source) and a referential integrity input. The method further includes migrating the flat file (i.e., data source) to the at least first and second tables in accordance with and maintaining the above-referenced RI.

The foregoing and other aspects, features, details, utilities, and advantages of the present disclosure will be apparent from reading the following description and claims, and from reviewing the accompanying drawings.

DETAILED DESCRIPTION

Figure 1:
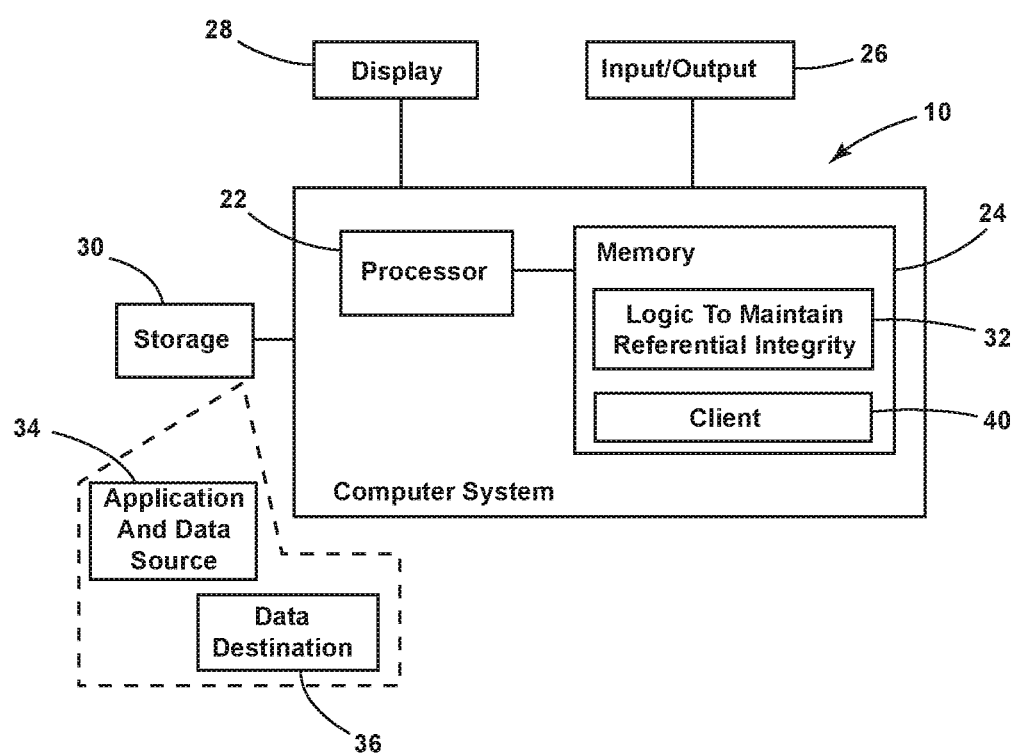
FIG. 1 is a simplified schematic and block diagram of an apparatus to maintain referential integrity, in an embodiment.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Before proceeding to a detailed description, a general overview of a system and method for maintaining referential integrity while masking and/or migrating data in flat files will be first set forth. The system, in an embodiment, has a capability of maintaining referential integrity during data migration and/or masking process wherein a user selects one or more flat file(s) as a data source and the system automatically identifies the referential integrity columns in the case where column names match in different tables and/or flat file(s). The system, in an embodiment, can automatically identify referential integrity for a flat file by analyzing an application source (code) for embedded business rules that are indicative of referential integrity. In an embodiment, a user can also configure the referential integrity on the source data set. This is known as a user-defined referential integrity.

In an embodiment, a user can select the data destination and then starts the execution. The system maintains the configured referential integrity in the data store/configuration engine (e.g., an XML file containing the referential integrity definitions, among other things). This configuration in the data store may be, in an embodiment, always available throughout the life cycle of the system. The system reads the configuration from the data store and then migrates and optionally masks the data from the data source into the destination system (i.e., target). Data redundancy and integrity is also addressed by the system, in an embodiment.

Unique differentiators of the system, in embodiments. Conventional systems refer to masking methods to maintain referential integrity (RI) in a relational database, however, none can provide referential integrity while migrating data from a flat file(s) to a flat file(s) or a flat file(s) to a relational database as can the various embodiments. Embodiments consistent with the instant disclosure can provide automatic detection of RI in flat files depending on data header name(s), can provide automatic detection of RI in flat files depending on embedded business rules in an associated application source code, can provide for user-defined RI preservation, and can provide for data migration at a logical dataset level with user-defined referential integrity.

Embodiments consistent with the instant disclosure can provide masking and also provide the ability to encrypt and decrypt data during migration process(es). Masking may be done by the system, in an embodiment, and which may be irreversible i.e., once the data is masked, it cannot be converted back to the original state. However, in an embodiment, once the data is encrypted, it can be converted back to the original state by decryption, which embodiment can use, for example only, a Triple Data Encryption Standard (DES) algorithm for encryption and decryption of data.

Additionally, embodiments consistent with the instant disclosure can provide an ability to scan an application source code in order to define the referential integrity (RI) in the flat files. For example, if there are two flat files called "Customers" and "Orders", then the system has the capability to scan the application source code and determine the rules for RI e.g., that the "Orders" file should not have any orders for any customers that are not present in the "Customers" file.

Figure 5:
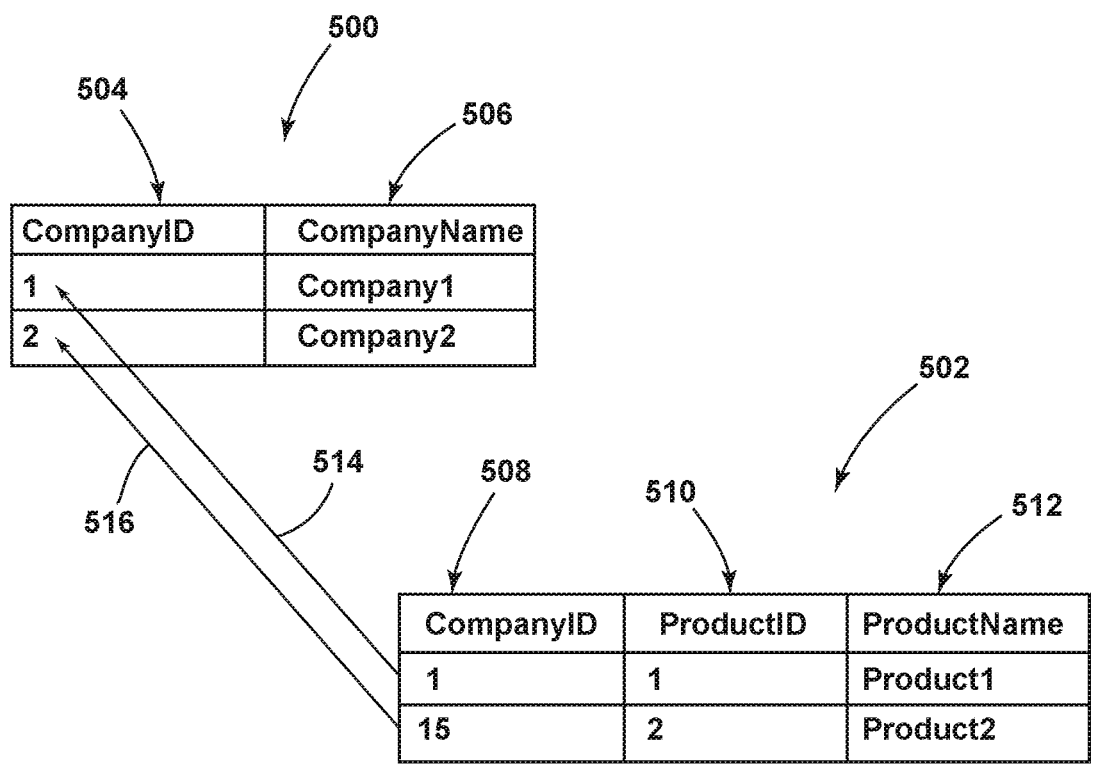
FIG. 5 is a simplified block diagram showing first and second tables illustrating referential integrity therebetween, in an embodiment.

Understanding referential integrity (RI). Referential integrity refers to consistency and accuracy of data within a relationship. The data relationships can be linked between two or more tables. Reference is now made to FIG. 5 to illustrate the concept of referential integrity.

FIG. 5 is a simplified schematic diagram showing a primary table 500 and an associated table 502. In the illustrated embodiment, table 500 includes a first column 504 called "CompanyID" and a second column 506 called "CompanyName" while table 502 includes a first column 508 called "CompanyID", a second column 510 called "ProductID", and a third column 512 called "ProductName". Referential integrity (RI) is achieved by having a so-called foreign key value in the associated table 502 make reference to a primary key value in the primary or parent table 500. Satisfying this condition ensures that the data on both sides of the relationship remain intact (i.e., in the associated table(s) and in the primary or parent table). In particular, referential integrity requires that, whenever a foreign key value is used it must reference a valid, existing primary key value in the parent table. In FIG. 5, the column "CompanyID" as column 508 in the associated table 502 corresponds to column 504 (also called "CompanyID") in the primary table 500. In the example, the foreign key value of "1" in column 508 makes reference to an existing (valid) primary key value of "1" in column 504 of the primary table 500, and thus referential integrity exists. This is shown as line 514 between the foreign key value and the primary key value. In a contrary situation, however, the foreign key value of "15" in table 502 does not make reference to an existing primary key value having a value of "15" in column 504 of the primary table 500. The record with CompanyID of "15" is thus orphaned. Line 516 shows the attempted but unsuccessful match between a foreign key value in the associated table 502 and the any primary key values in the primary or parent table 500.

There are many benefits of defining referential integrity in a database. One benefit relates to improved data quality. In this regard, one benefit involves an increase in the quality of data that is stored in a database. There can still be errors, but at least data references are genuine and intact, as well as valid. Another benefit relates to faster development. In this regard, note that referential integrity is declared. This is much more productive (e.g., by one or two orders of magnitude) than writing custom programming code. That is, once referential integrity is declared between the tables, this helps in avoiding writing custom code. For example, if any record is deleted from a master table, then due to referential integrity, the respective child records will automatically get deleted from all child tables, thereby avoiding the writing of code to accomplish the above-referenced deletions. Another benefit involves fewer bugs in the code. In this regard, the declarations of referential integrity are more concise than the equivalent programming code. In essence, such declarations reuse the tried and tested general-purpose code in a database engine, rather than redeveloping the same logic on a case-by-case basis, in the same manner as described above. A still further benefit involves improved consistency across applications. In this regard, referential integrity ensures the quality of data references across the multiple application programs that may access the subject database (with referential integrity).

The relationship between two tables is created by defining a primary key and a foreign key. It is an internal feature of a relational database management system (RDBMS) to define the relationships and to store the same as constraints on a server computer or locally. This ensures referential integrity and avoids redundancy of the data. But the same cannot be achieved with the data that is stored in flat files.

Challenges when working with flat files. Some of the challenges faced while masking and migrating a flat file data include at least redundancy and data integrity, as described in further detail below.

Redundancy. A flat file has a very simple row and column structure. There are no relationships between data that are contained or otherwise expressly defined in the flat file itself. One of the main weaknesses of this type of file is that the data has to be repeated. In the example below in Table 1, each subject that a student studies has to be entered as a separate record. Look at the entries associated with "Bob Salas". His name is recorded twice (i.e., two records in Table 1) because he studies both Math and English.

TABLE 1

Example Flat File

| Student ID | First Name | Last Name | SubjectID | Subject | 1Semester | 2Semester |
|---|---|---|---|---|---|---|
| 10002 | Bob | Salas | 1 | Math | 67 | 88 |
| 10003 | Martha | Roberts | 2 | English | 78 | 63 |
| 10002 | Bob | Salas | 2 | English | 76 | 94 |
| 10004 | Shin | Chain | 5 | Science | 59 | 70 |

Data Integrity. The more often data has been recorded, the higher the possibility that the data has or will have an error or some other inconsistency.

Architecture. An overview of a system 10 for maintaining referential integrity will be described in connection with FIG. 1 while a more functional depiction and description will be set forth in connection with FIGS. 2-4.

FIG. 1 is a simplified block diagram view of a computer system 10 for maintaining referential integrity while masking and/or migrating data in flat files, in an embodiment. System 10 is configured, for example only through programming with a set of instructions, to perform any one or more of the functions, methods, and/or tasks as described in greater detail herein. The system 10 may be a personal computer, a notebook computer, a server, a tablet computer, a personal digital assistant ("PDA"), a smartphone, or any other computing machine or collection of computing machines capable of executing a set of instructions to perform as described for system 10.

The system 10 includes an electronic processor 22 and a memory 24, a variety of input/output devices generally represented by input/output block 26 and may include a display 28. The system 10 may further include or be configured to communicate with non-transitory memory, shown as a storage block 30, which may include a local disk drive but may include a data source 34 (including a data source and/or an application source code) as well as a data destination 36, which may comprise conventional database management systems that can be connected to in a conventional manner or may include at least first and second flat files. The data source 34 and the data destination 36 will be described in greater detail below.

Processor 22 may comprise a central processing unit (CPU) of conventional construction and my comprise one or plural processors acting in concert. Processor 22 generally may include processing capabilities as well as an input/output (I/O) interface through which processor 22 may receive a plurality of input and generate a plurality of outputs. Memory 24 is provided for storage of data and instructions or code (i.e., software) for processor 22. Memory 24 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

The system 10 is further configured by way of a logic module 32, which as implemented in an embodiment may include code or instructions, which when executed by processor 22, is configured to perform a variety of functions described herein in order to maintain referential integrity while masking and/or migrating data in flat files, among other things. Details of logic module 32, in embodiments, will be described below in connection with FIGS. 2-4.

It should be understood that for the purposes of this specification, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

The system 10 may operate according to a supporting operating system, for example only, Microsoft Windows (e.g., 32-bit and/or 64-bit versions), variants of Linux, Apple Mac OS X, and the like, and may further include one or more a client application program(s) 40, such as a web browser or the like.

Figure 2:
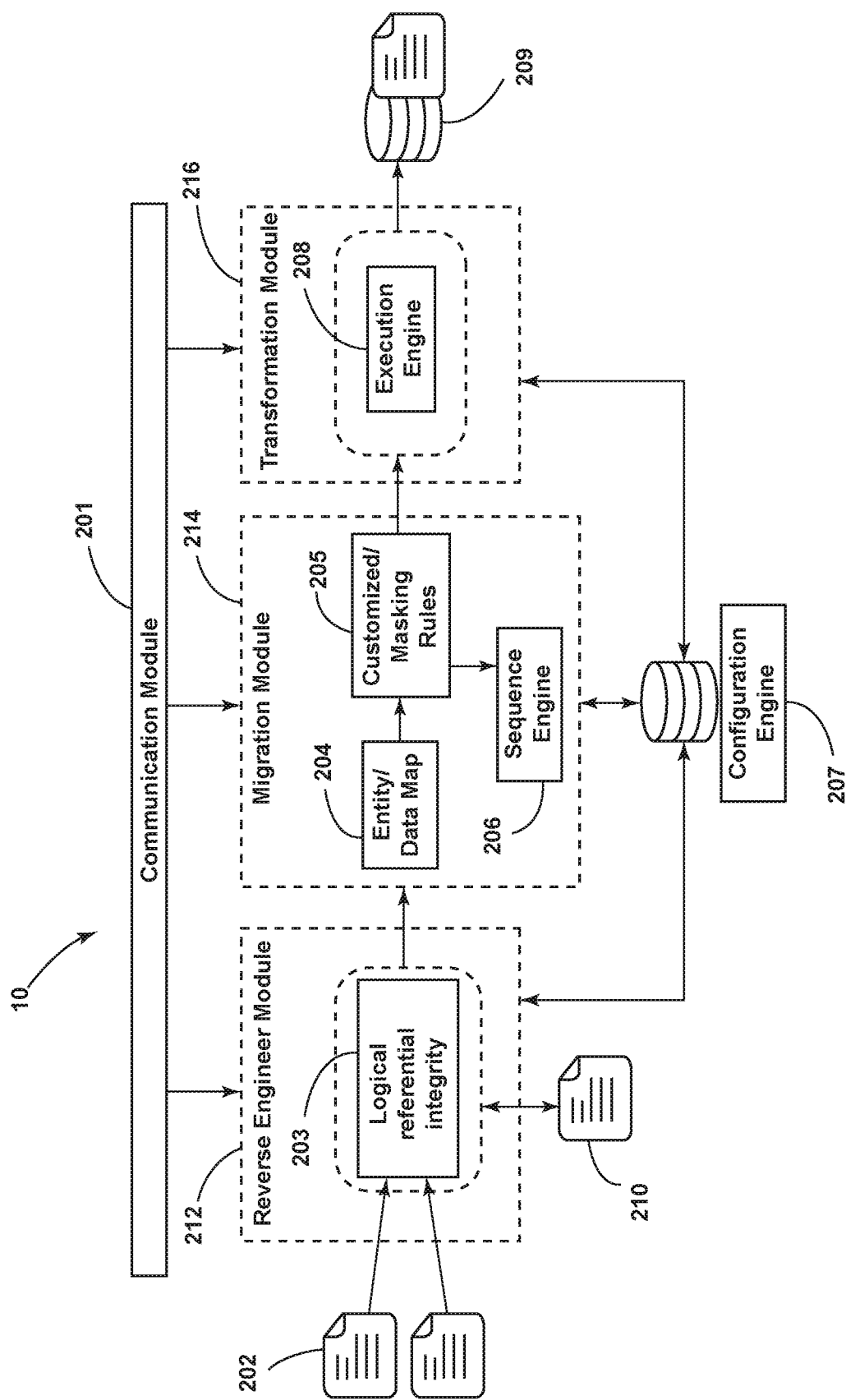
FIG. 2 is a simplified schematic and block diagram showing, in greater detail, the logic module to maintain referential integrity shown in FIG. 1, in an embodiment.

FIG. 2 is a simplified block diagram of an embodiment of system 10 of the instant disclosure, showing logic module 32 in greater detail. The logic module 32 for maintaining referential integrity (of system 10) may include a plurality of modules, including, as shown, a communications module 201, a reverse engineer module 212, a migration module 214, a configuration engine 207, and a transformation module 216. FIG. 2 further shows input data source file(s) 202 as well as input application source code 210 and output destination data file(s) 209. These modules are configured to interact with each other as illustrated and described herein.

The communication module 201 is configured to provide a user interface (UI) used by a user in order to provide a plurality inputs to the other modules of the system 10.

The reverse engineer module 212 is coupled to modules 201, 214, and 207 and includes the logical referential integrity block or module 203 that is configured to ensure logical referential integrity, including execution of supporting functions such as being configured to read source data file(s) 202 and read application source code 210 in order to analyze and determine business rules (i.e., extract the business rules that are embodied therein). Accordingly, the reverse engineer module 212 via the logical referential integrity module 203 is further configured to describe and output a schema as well as output the determined referential integrity of the source to the data store associated with configuration engine 207, as will be described below.

The migration module 214 is coupled to modules 201, 212, 207, and 216 and includes the entity/data map module 204 that is configured to store a mapping of and between the source and destination columns (i.e., between the columns in the data source file(s) 202 and the corresponding columns destination file(s) 209). The migration module 214 further includes a customized/masking rules module 205 that is configured to store any data filter(s) and/or any data masking rule(s), as will be described below. The migration module 214 further includes a sequence module or engine 206 that is configured to structure/build a hierarchical order of tables and columns according to any constraints/referential integrities that will be used for the actual migration of data.

The transformation module 216 includes an execution module or engine 208 that is configured to create a schema target for, and to be used in, the destination data file(s) 209. The execution engine 208 is further configured to filter data (if applicable), mask data (if applicable), and then migrate data from the data source file(s) 202 to the destination data file(s) 209.

The configuration module or engine 207 is configured to operate as a data store (illustrated as a database icon in FIG. 2), which data store may take the form of a file containing text in XML format, in an embodiment (i.e., the XML file also being known as a data store). This will be described in greater detail below. The configuration engine 207 is configured to interact with all of the other modules, in other words, the reverse engineer module 212, the migration module 214, and the transformation module 216. In an embodiment, these other modules are configured to interact with the configuration engine 207 in order to (i) update the data store; and (ii) read from the data store.

With continued reference to FIG. 2, the communication module 201 is configured to provide a user interface, as noted above, through which a user provides the below-described inputs for further use in the operation of the various modules of system 10, namely: (i) an identification of the data source file(s), i.e., the file(s) 202 that have data contained therein that is to be migrated/masked; (ii) an identification of the destination data file(s) 209 i.e., the file(s) 209 in which the data that is to be migrated/masked will be stored; (iii) a user-defined referential integrity (i.e., a logical description) that is to be provided to the logical referential integrity module 203; (iv) one or more source and destination column mappings input that is provided to the entity/data map module 204; (v) functionality to allow the user to create rule(s) and apply masking on specified columns of data, which will be accepted as an input by the customized/masking rules module 205; (vi) an option presented to the user on whether to migrate the schema and data (i.e., both) OR to migrate only the data, for example, in the case where the schema is already present in the destination data file(s) 209. For example, this may be an option that allows the user to check one of the above two options, which input will be stored and then used as input by the execution engine 208.

In an embodiment, there can be cases where the system 10 receives data in flat files from a third-party interface. The system 10 can also work in batch mode to mask/migrate such data. Accordingly, in this embodiment, the communication module 201 may be optional in the execution and all entries described above in connection with the UI of module 201 can instead be made (i.e., provide with) in a batch mode embodiment.

Reverse engineer module 212 may operate as follows. The data source file(s) 202 represents the source heterogeneous databases, including flat files in FIG. 2, which were identified and input through the use of the user interface of the communication module 201, as described above. The application program source (code) 210 represents the application source code, which may contain data referential integrity embedded as business rules in the application source. The identification of the application source (code) file(s) 210 can be received as an input via the communication module 201.

Referential integrity is created (i.e., determined) either automatically by the system 10 (overall the operation of the logic module 203) or can be defined by the user using the user interface of the communication module 201. The latter situation allows for the user to input what is known as a user-defined referential integrity. In some cases, referential integrity is defined as or by way of business rules that are described and defined in the application source (code). In such cases, the system 10 in general, and the logical referential integrity module 203 in particular, is configured to analyze the application source (code) that has embedded business rules that define referential integrity that exist in the input data sources 202. In an embodiment, business rules embedded in application source code may be identified and/or extracted by approaches known in the art, including, in an embodiment, as described in U.S. application Ser. No. 15/397,486, filed on 3 Jan. 2017 (hereinafter the '486 application), entitled METHOD AND APPARATUS FOR BUSINESS RULE EXTRACTION, now U.S. Pat. No. 10,162,611. The '486 application is hereby incorporated by reference as though fully set forth herein. It should be understood that this functionality may be configured through a separate module configured to extract business rules from application source code by way of in-built algorithms for static and automatic business rules extraction.

In an embodiment, user-defined referential integrity is precisely defined by the user using communication model 201. The user may define the RI, for example only, when there is a strong business need to do so and the referential integrity was not detected by the operation of the logical referential integrity module 203 automatically. For example, the automatic detection may not complete successfully if the column names do match sufficiently, for example, if a flat file A has a column field called "CreditCardNumber" and a flat file B has a column field called "CCNumber". In this example case, assuming for the purposes of description only that the logical referential integrity module 203 will fail to automatically detect the referential integrity because there is no way to have the required primary key/foreign key relationship in these flat files by virtue of the column name mismatch. In such scenarios, the user can instead use the user interface (UI) in the communication module 201 to specifically define/create a referential integrity between the "CreditCardNumber" column field of the flat file A and the "CCNumber" column field of the flat file B.

The logical referential integrity module 203 of the reverse engineer module 212 is configured to connect to the data source 202 using a connector, such as System.IO in a Microsoft .NET embodiment (i.e., the System.IO namespace contains types that allow reading and writing to files and data streams and types that provide basic file and directory support). It should be understood the present teachings are not so limited and may be implemented using other well-known and conventional software development platforms.

The logical referential integrity module 203 is further configured to then read the first row/header of a data source file 202 to identify the column names from the flat file(s) and then store the column names in column name objects associated with such flat file(s). The logical referential integrity module 203 then scans through flat file(s) column objects and automatically identifies possible logical referential integrity columns i.e., in the case the column names are the same in the tables of the flat files. In other words, if the respective column names in two or more of the input source file(s) are the same, then this situation is identified as requiring referential integrity treatment. The column name so identified and the referential integrity configuration are stored in the data store associated with the configuration engine 207, i.e., the data store/configuration engine 207. The data store of the configuration engine 207 will be available to all system modules (see FIG. 2 and associated descriptive text for references to the various modules) for accessing the stored configuration.

In an embodiment, by virtue of the user interface portion of the communication module 201, a user can view all the columns from the input data source flat file(s) (i.e., file(s) 202) and is also configured to allow the user to indicate/select on which column(s) the user wants to create a new user-defined referential integrity using the communication module 201. This new user-defined referential integrity configuration is stored in the data store of the configuration engine 207 as well.

In an embodiment involving a SQL, Oracle and/or other RDBMS systems, the logical referential integrity module 203 automatically identifies the referential integrity and stores it in the data store in the configuration engine 207. In particular, it should be understood that the foregoing is an instance where SQL, Oracle, or other RDBMS system as the data source.

A description of the migration module 214 will now be set forth. The entity/data map module 204 connects to the data store of the configuration engine 207 and gets all the determined columns of the data source, and also connects to the destination file(s) 209 and gets the destination columns (i.e., the column names). Using the communication module 201, the user can select the columns from the source file(s) 202 and map it with a destination column. Once the user completes the mapping process, the entity/data map module 204 updates the configuration (data store) in the configuration engine 207 with this mapping information.

The customized/masking rules module 205 gets all the columns from the entity/data map module 204 (i.e., the columns that were identified by and/or through the module 204). Using the communication module 201, the user can use these columns to define customized/filter rule(s) in order to filter or migrate only specific data that matches the rule. For example, the user can add a condition, where the "State" column is equal to "California". Using the communication module 201, the user can also apply pre-built masking on these columns. Once the user applies the rule(s) and masking)s as specified, the customized/masking rules module 205 will then update the respective configuration (data store) in the configuration engine 207.

The sequence engine 206 connects with the configuration engine 207 and gets all the configuration and referential integrities established between the columns that have been configured in the logical referential integrity module 203. In an embodiment, the sequence engine 206 will build a tree view structure/hierarchical order of table/columns based on same. This hierarchy/sequence will be configured in the configuration engine 207 (i.e., in the data store associated with configuration engine 207) and will also be used by the execution engine 208 as input for further processing.

For example, a tree structure may comprise a hierarchal view with grouped-by (Expand-collapse) values. First, it will display the Server Name and Database Name/flat file name. When you click on the name, the section will expand and it will display all the table names under the section. When user clicks on any table name, the same section will expand and it will display all the columns (with data types) and the constraints (if any) under the section.

A detailed description of the transformation module 216 will now be set forth. The execution engine 208 connects with the data store of the configuration engine 207 and gets the configuration i.e., the outputs of the logical referential integrity module 203 and the sequence engine 206. Accordingly, the execution engine 208 generates the script to create the schema in the destination or output data file(s) 209, i.e., which is the target system. The schema may refer to the schema for the output file(s), or in other words, may refer to the schema (e.g., table, columns with data types, etc.) of the output. The execution engine 208 reads configurations (example of same in illustrations) from the configuration engine 207 (data store) and accordingly creates, for example, a so-called SQL insert query (i.e., script) to create the schema in the target/destination 209 (e.g., RDBMS).

Upon completion of schema creation, the execution engine 208 again reads the configuration information from the data store of the configuration engine 207, but this time it reads the output(s) of the entity/data map module 204 and the customized/masking rules module 205 and accordingly gets (reads) the data from the data source file(s) 202 and stores the data into memory. Based on the entity/data map module 204 configuration, the execution engine 208 applies the rules on the data and updates the data in memory.

If masking is applied on one column of a table that forms referential integrity with another column in another table, according to the logical referential integrity module 203, then the execution engine 208 is configured to apply the same masking on the other column. The execution engine 208 is further configured to update the data accordingly in memory so the referential integrity will be maintained, even after the masking is applied on the referential integrity columns.

Based on the configuration established by entity/data map 204 and the customized/masking rules module 205, the execution engine 208 creates an insert script and stores the script in the memory. The execution engine 208 then executes the script to insert the data into the tables on the destination or output data file(s) 209. In the case where the destination is a SQL system, then the system 10 will generate an SQL query i.e. insert query to insert the data into the destination table. In an embodiment, therefore, the insert script refers to a SQL insert query.

Figure 3A:
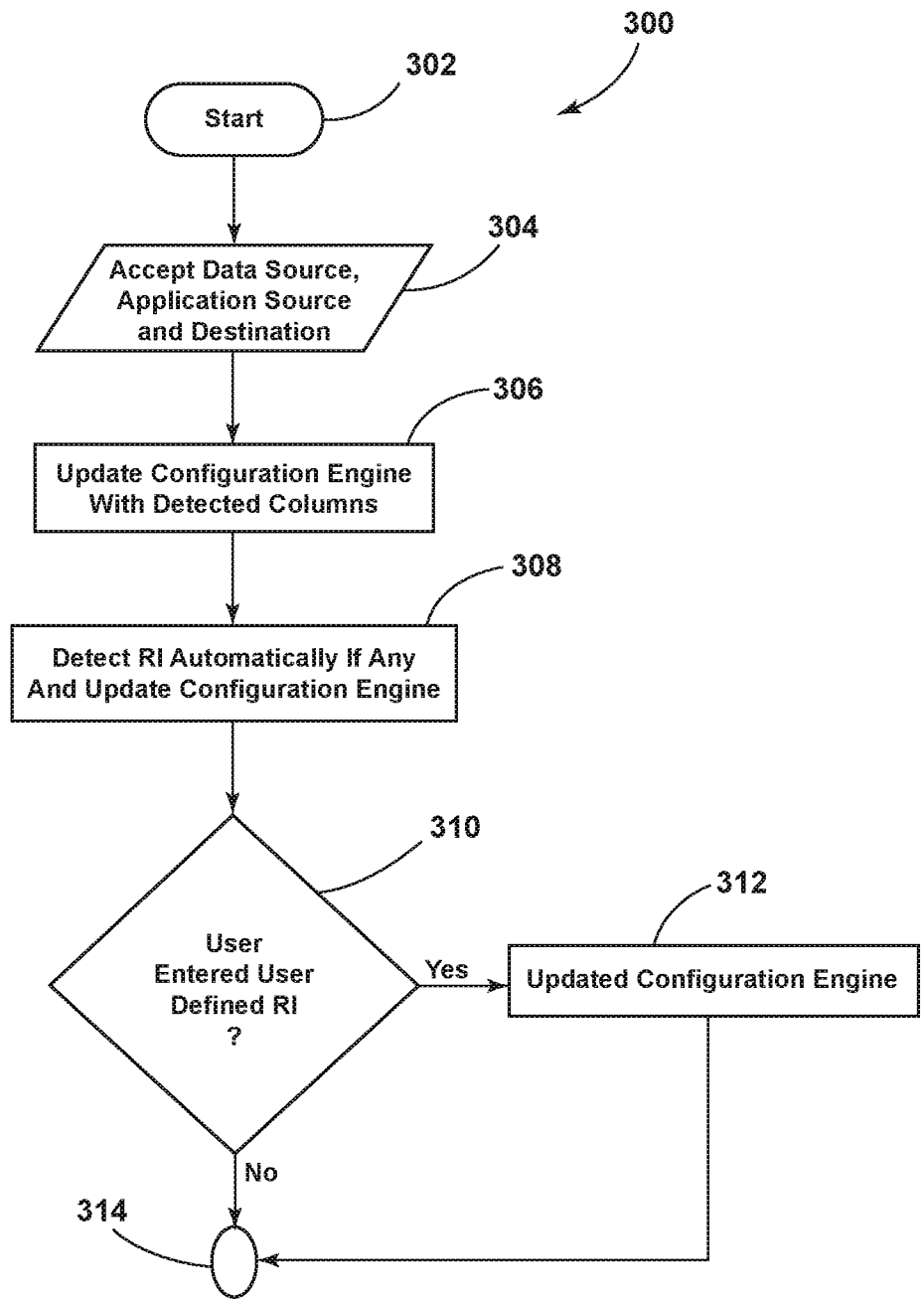
FIGS. 3A-3B are simplified flowchart diagrams illustrating a method of operation of the apparatus of FIG. 2, in an embodiment.
Figure 3B:
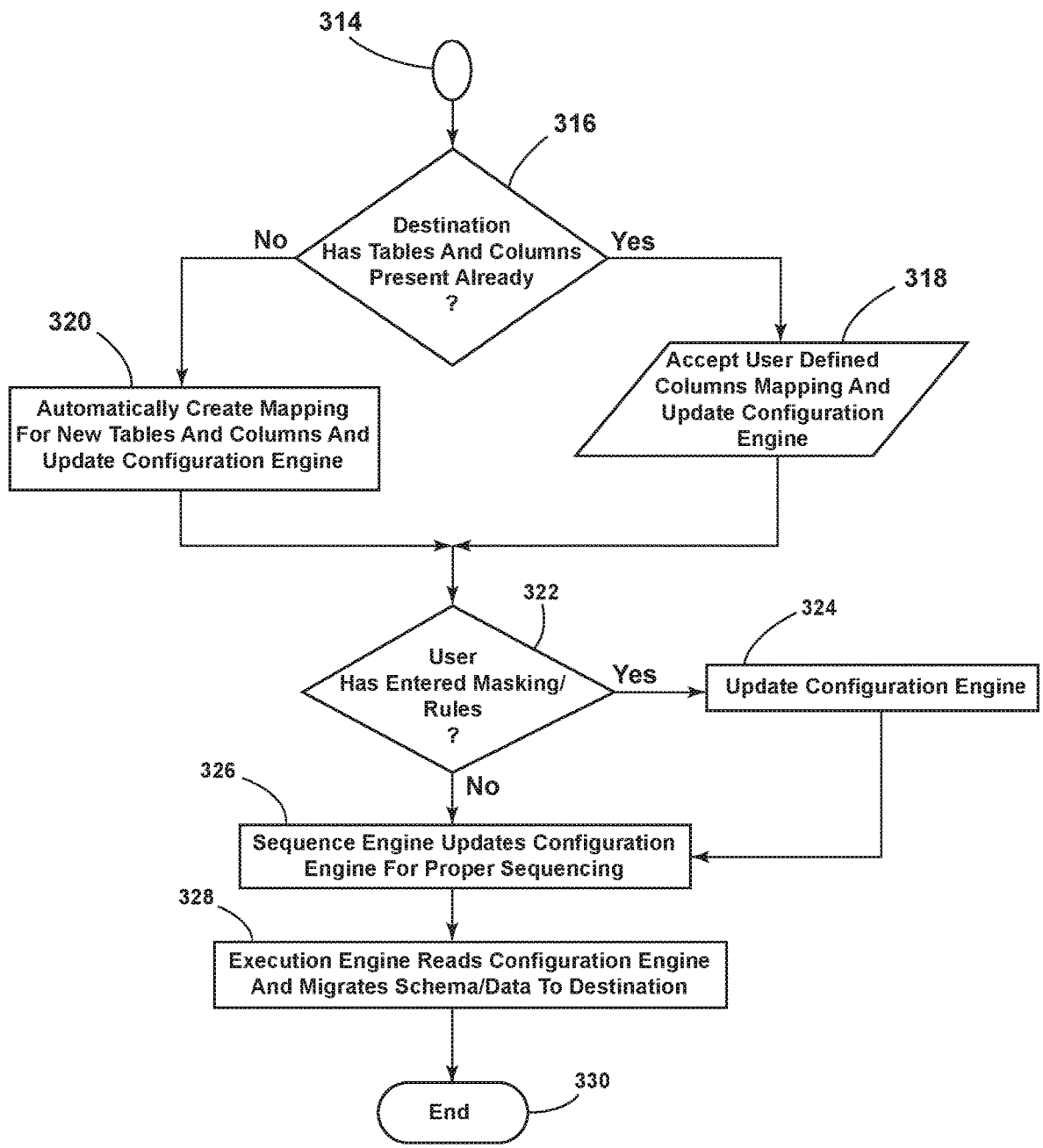

FIGS. 3A-3B are simplified flowchart diagrams illustrating a method 300 of operation of an embodiment of the system 10 configured to migrate data from a data source to a data destination while maintaining referential integrity. The method begins in step 302 and proceeds to step 304.

In step 304, the system 10 is configured to accept from the user an identification of the data source file(s) 202 that constitute the input for data migration, an identification of an application source code file 210 (if any), and an identification of a destination or output data file(s) 209. In an embodiment, the step 304 may be performed using a user interface (UI) provided by the communication module 201 as described in greater detail hereinabove. The method then proceeds to steps 306 and 308.

In step 306, the logical referential integrity module 203 automatically detects the columns in the input data source 202 and stores the detected column information (e.g., column names) in the data store associated with the configuration engine 207.

In step 308, the logical referential integrity module 203 automatically detects the referential integrity relationship(s), if any (i.e., depending on the column names), and then stores this determined information (i.e., RI relationship(s)) in the data store associated with the configuration engine 207, as described above. Also in step 308, the logical referential integrity module 203 is configured to scan the application program source (code) 210 and analyze such code for any embedded business rules and then automatically sets the referential integrity (RI) in the data store associated with the configuration engine 207 (i.e., where the RI is defined in and by the application source 210). The method then proceeds to steps 310 and 312.

In step 310, the system 10, via the logical referential integrity module 203 as described above, obtains any user-identified RI relationship(s) and then determines that, in the case where there are such user-defined RI, will then update the data store of the configuration engine 207 (in step 312). The method proceeds to junction 314, which is where the method proceeds if there are no user-defined RI determined in step 310. The method proceeds from junction 314 to step 316.

In step 316, the system 10 checks whether the destination file(s) has/have tables with columns that are already present. In an embodiment, the entity/data map module 204 performs the above-referenced check. If so, then the method proceeds to step 318.

In step 318, the entity/data map module 204 executes, using the user interface of the communication module 201, and is configured to accept source and destination column mapping(s) from the user, as described in greater detail above. If the answer to the question in step 316 is NO, then the method proceeds to step 320. In step 320, for the case where any table(s), having certain columns, are required to be migrated as a destination file or files (i.e., file(s) 209), then the entity/data map module 204 automatically creates the mapping for the new tables and columns, where in an embodiment, the module 204 assumes that the table names will be same as the flat file names and destination column names will also match the source column names. As also shown in step 320 of the flow chart, the entity/data map module 204 also then updates the data store associated with the configuration engine 207 accordingly. The method proceeds to step 322.

In step 322, using the user interface provided by the communication module 201, the customized/masking rules module 205 executes and is configured to accept from the user one or more masking rules (instructions) to be applied to any column or any rule defined to filter the data being migrated. If there are any user-defined masking rules/filters as a result of step 322, then the method proceeds to step 324 but otherwise would proceed to step 326.

In step 324, the system 10, via module 204, is configured to update the data store associated with the configuration engine 207 based on the results/outputs from the operation of step 322. The method then proceeds to step 326.

In step 326, the sequence engine 206 then scans the data store associated with the configuration engine 207 and accordingly updates the data store of the configuration engine 207 for proper sequencing of the migration, like which table needs to be created first, etc. Depending on the operational outputs of modules 201, 202, 203, 204, 205, the configuration engine 207 keeps updating with the actions that needs to be performed by the execution engine 208. The sequence engine or module 206 is closely associated with module 207 and the sequence module 206 sequences the actions to be performed, for example, by indexing them. In an embodiment, the sequence module 206 may be configured to assign a respective index to each action that helps execution engine 208 to decide which action to perform first. The method proceeds to step 328.

In step 328, the execution engine 208 of the transformation module 216 is configured to read the configuration information from the data store associated with the configuration engine 207 and then is further configured to create scripts, which when executed (e.g., by the execution engine 208 itself) will operate to migrate the determined schema and data to the destination or output data file(s) 209. The scripts, in an SQL embodiment, may comprise SQL create/insert queries that are executed by the execution engine 208 in order to create tables/columns and insert records into the data destination file(s) 209. The method then proceeds to step 330 ("End").

In an embodiment, the data store associated with the configuration engine 207 may comprise an XML file that stores all the configuration information, for example, under pre-defined XML tags, which is depicted in exemplary fashion in Tables 3-7.

Illustrative Example 1

For example, Company A takes customer orders for their products. Company A uses a flat file with a single table, as illustrated in Table 2 below, to record their orders they receive. The intent here of the proposed migration will be to split the data in the single table into two different flat files (already having Customer and Order tables) in order to segregate the Customer and Order information. Being a flat file, the system 10 via logic module 32 (FIG. 1) will not be able to automatically detect the referential integrity as described above. So in this embodiment, the system 10 via logic module 32 will need to collect and apply user-defined referential integrity, which will be collected using the user interface of communications module 201, as described in detail above. Table 2 is shown below.

TABLE 2

Company A "Order" file (flat file)

| Order ID | CustomerID | Customer Name | Address | Payment Method | CreditCard Number | OrderTotal |
|---|---|---|---|---|---|---|
| 1 | C50002 | Bob Roberts | 104, Pee Avenue, NY | CC | 222222222222 | $35.85 |
| 2 | C50009 | Julie Bertson | 360, Bloom Ave, CA | CC | 222224343433 | $85.20 |

TABLE 2-continued

Company A "Order" file (flat file)

| Order ID | CustomerID | Customer Name | Address | Payment Method | CreditCard Number | OrderTotal |
|---|---|---|---|---|---|---|
| 3 | C50002 | Bob Roberts | 104, Pee Avenue, NY | CC | 454546656556 | $35.85 |

Below are the steps for migration/masking of the data along with maintaining user-defined referential integrity. Using the user interface of the communication module 201, the user will provide the data source file(s) 202 (i.e., identification of the files) and the identification of the destination or output data file(s) 209. Here, the data source file 202, i.e., the source file comprises the Company A "Order" flat file (please see Table 2). The user also identifies, through the UI of the communications module 201, the one or more destination or output data file(s) 209, i.e., the identification of the destination files 209 comprising two flat files, viz., a first flat file called an "Order" flat file and a second flat file called a "Customer" flat file.

In addition, the logical referential integrity module 203 is configured to scan, if specified, an application source (code) file(s) 210 (e.g., application source code). In this example, the application source code files 210 will have or otherwise contain the below-reproduced rules for defining referential integrity:

(i) "Each order when it gets stored in Order file, its respective CustomerID should exist in Master Customer file"; and (ii) "If a CustomerID from master Customer file gets removed, remove all corresponding orders for that CustomerID in Order file".

As mentioned above, referential integrity may be maintained in the application code itself by way of embedded rules. For example, COBOL programs (source code) can store the relationship of keys between two files. For example, the location taken from a Master Location file may act like a primary key, and concurrently the such location may act as a foreign key in an Employee file, where the location is given for each employee. Such referential integrity (RI) is neither system RI, like defined in schemas for an RDBMS, nor is it entered via some screens to make it user-defined RI. Such referential integrity is written deep inside the code through some rules like below: (i) "Each employee, when it gets stored in Employee file, has to have a location that exists in Master Location file"; (ii) "If a location from Master Location file gets removed, remove all corresponding employees from Employee file OR set their location to spaces". So the logical referential integrity module 203 is configured to scan application source (code) 210 using the respective APIs and other data connectors. In this regard, in an embodiment, and as mentioned in the example herein paragraph, the logical referential integrity module 203 may be part of a tool that is built in the C# .NET environment and it is configured to read the source code (depicted as 210) which may be in the COBOL language. Hence there is a need that module 203 has respective DDLs or APIs or data connectors for connecting with file 210 containing COBOL so that the source code or data can be interpreted and the required information can be fetched.

The logical referential integrity module 203 will connect to the data source 202 using, for example, the System.IO connector (e.g., in a .NET embodiment) and will scan all columns to update the data store associated with the configuration engine 207.

Table 3 illustrates a configuration associated with and in the configuration engine 207 for a column called the CustomerID column. Similar configurations will be stored in the data store associated with the configuration engine 207 for all the other columns by way of the operation of the logical referential integrity module 203 as described herein.

TABLE 3

```
<Column>
    <UniqueID>a59cfa31-92a2-4d65-9853-662081ff911f</UniqueID>
    <Name>CustomerID</Name>
    <IsSelected>true</IsSelected>
    <Source>Company A</Source>
    <IsPrimaryKey>false</IsPrimaryKey>
    <IsForegienKey>false</IsForegienKey>
    <OrdinalPosition>0</OrdinalPosition>
    <IsNullable>false</IsNullable>
    <DataType>string</DataType>
    <CharacterMaxLength>0</CharacterMaxLength>
    <TableName>shiporder</TableName>
    <IsMigrationKey>false</IsMigrationKey>
    <PrefixLengthForMasking>0</PrefixLengthForMasking>
</Column>
```

The logical referential integrity module 203 will scan the application program source (code) 210 and automatically set referential integrity on the CustomerID column and update the data store associated with the configuration engine 207 accordingly as illustrated in exemplary fashion in Table 4. Alternatively, using the user interface of the communication module 201, the user will specify/apply a user-defined referential integrity (RI) (e.g., noted as a Constraint) on the CustomerID column. The logical referential integrity module 203 will take this user-defined RI and then update the data store associated with the configuration engine 207. Such a constraint is shown in exemplary fashion as illustrated in Table 4. It should be understood that in an embodiment, the data store associated with the configuration engine 207 may comprise an XML file, as mentioned above.

TABLE 4

```
<Constraint>
    <UniqueID>63c39dab-49fd-4230-8c67-6f0ce15ab3b4</UniqueID>
    <Name>CustomerID</Name>
    <IsSelected>true</IsSelected>
    <IsManuallyAdded>false</IsManuallyAdded>
    <ConstraintType>PRIMARY_KEY_CONSTRAINT</ConstraintType>
    <OrdinalPosition>1</OrdinalPosition>
    <TableUniqueID>67f6fe60-dd03-4455-99fe-e89e82625921
    </TableUniqueID>
    <TableName>tbl_CCN</TableName>
    <ColumnUniqueID>64810efc-04a2-41fc-9eac-b64536f95cb9
    </ColumnUniqueID>
    <ColumnName>CustomerID</ColumnName>
    <DiaplayName> CustomerID </DiaplayName>
</Constraint>
```

Next, the entity/data map module 204 will scan all the columns from the data source 202, i.e., the source flat file and the destination or output data file(s) 209, i.e., the destination flat files for their respective columns as well. Using the user interface of the communication module 201, the user can then create any user-defined mappings between the data source and data destination columns. The entity/data map module 204 will then accordingly update the data store associated with the configuration engine 207, as illustrated in exemplary fashion in Table 5 below.

TABLE 5

```
<Column>
    <UniqueID>ce0514c8-154a-46a9-8fac-d5b653ceb582</UniqueID>
    <Name>CreditCardNumber </Name>
    <Destination>Order</Destination>
    <DestiColumnName>CreditCardNumber </DestiColumnName>
    <IsSelected>true</IsSelected>
    <IsPrimaryKey>false</IsPrimaryKey>
    <IsForegienKey>false</IsForegienKey>
    <OrdinalPosition>2</OrdinalPosition>
```

In this first illustrative example, the user—using the communication module 201 via module 205—applies a "Nulling" masking on the CreditCardNumber column in order to maintain confidentiality. There is no filter rule applied as the user intends to migrate all the data from source flat file. The customized/masking rules module 205 will scan the applied masking and update the data store associated with the configuration engine 207, as illustrated in exemplary fashion in Table 6.

TABLE 6

```
<Column>
    <UniqueID>86eedcda-5b9d-44c0-b2a4-486307abfa68</UniqueID>
    <Name> CreditCardNumber</Name>
    <IsSelected>true</IsSelected>
    <IsPrimaryKey>false</IsPrimaryKey>
    <IsForegienKey>false</IsForegienKey>
    <OrdinalPosition>9</OrdinalPosition>
    <Default />
    <IsNullable>true</IsNullable>
    <DataType>nvarchar</DataType>
    <IsUpdatedDataType>false</IsUpdatedDataType>
    <CharacterMaxLength>100</CharacterMaxLength>
    <TableName>Order</TableName>
    <MaskingType>Nulling</MaskingType>
    <IsMigrationKey>false</IsMigrationKey>
</Column>
```

The sequence engine 206 will then scan the data store associated with the configuration engine 207 and also according to the referential integrity set by the logical referential integrity module 203, the sequence engine 206 will update the configuration engine 207 in order to migrate the Customer A "Order" table data first, as it has the primary key constraint, i.e., CustomerID. The same is illustrated in exemplary fashion in Table 7. The same logic is applied to build a tree view structure that illustrates the sequence of migration, in an embodiment.

TABLE 7

```
<Table>
    <UniqueID>b3040d20-ac89-4a28-9ac2-44d37293c013</UniqueID>
    <Name>Customer</Name>
    <IsSelected>true</IsSelected>
    <SortOrder>1</SortOrder>
```

TABLE 7-continued

```
    <ServerUniqueID>1b0f4bfd-1a28-4e71-adf4-548dd93368de
    </ServerUniqueID>
```

Using the UI of the communication module 201, the user will select to migrate the data only option as the tables are already present in the destination or output data file(s) 209, i.e., the destination flat files. Recall, that there were two options: (i) schema and data migration versus (ii) data only migration. The execution engine 208 will get this input from the communication module 201 and will not migrate the schema. The system 10 will take inputs from the data store defined by the configuration engine 207 to migrate/mask the data to the destination or output data file(s) 209, as illustrated in Tables 8 and 9. In other words, the destination file(s) include two flat files (tables) called "Customer" table and "Order" table.

TABLE 8

("Customer" table)

| CustomerID | CustomerName | Address |
| --- | --- | --- |
| C50002 | Bob Roberts | 104, Pee Avenue, NY |
| C50009 | Julie Bertson | 360, Bloom Ave, CA |

TABLE 9

("Order" table)

| OrderID | CustomerID | OrderTotal | PaymentMethod | CreditCardNumber |
| --- | --- | --- | --- | --- |
| 1 | C50002 | $35.85 | CC | XXXXXXXX2222 |
| 2 | C50009 | $85.20 | CC | XXXXXXXX3433 |
| 3 | C50002 | $35.85 | CC | XXXXXXXX6556 |

Illustrative Example 2

Company X takes orders from its customers and maintains their details in a flat file called "User Details" (Table 10). Company X also maintain another flat file called "Rewards Redemption" to capture/calculate a customer's redemption points at the end of each financial year (refer to Table 11 for an example of the same).

The intent here is to migrate these two flat files to a SQL database environment. The migration will need to have a SQL environment ready for this migration. The system 10 is configured to connect with a SQL database (not shown, but may be storage 30 in FIG. 1). The system 10 will also scan the flat files and create tables, with same names as the flat files, in a SQL database. As both the tables in flat files have a column each with same name, i.e., "User ID", the system 10 will automatically create a referential Integrity (RI) based on this column name match. The system 10 will also apply masking on the "User ID" column so that this information will remain confidential and while migrating the data into the destination SQL environment/file(s) 209, the system 10 will ensure that the referential integrity is also maintained at the same time using the above-referenced column.

If we notice the below tables (Tables 10-11), then "User ID" is the column on which referential integrity is declared, i.e., that "User ID" is the primary key in respect of the "User Details" flat file and is also a foreign key in respect of the referenced/associated flat file "Rewards Redemption". But when we apply masking on the "User ID" column, the system 10 will mask the values in the "User ID" column in both the Tables 10-11 and still retain the referential integrity on the masked values.

TABLE 10

("User Details" flat file)

| User ID | User Name | Tax-SSN | DOB | Gender | Phone Number |
|---|---|---|---|---|---|
| 100312 | Ale J Wars | XXX-XX-2480 | Jun. 5, 1977 | Male | XXXXXXX365 |
| 100857 | Coli P Cars | XXX-XX-5093 | Jun. 4, 1983 | Female | XXXXXXX214 |
| 32558 | Willi Kunai | XXX-XX-4501 | Jun. 5, 1979 | Male | XXXXXXX219 |

TABLE 11

("Rewards Redemption" flat file)

| Redemption ID | User ID | Points Redeem | Product Order | SSN | City | Phone Number |
|---|---|---|---|---|---|---|
| 100052746854 | 100312 | 5 | Shop1 | XXX-XX-2480 | City1 | XXXXXXX365 |
| 108579416873 | 100857 | 4 | Shop1 | XXX-XX-5093 | City2 | XXXXXXX214 |
| 187975848524 | 32558 | 7 | Shop1 | XXX-XX-4501 | City3 | XXXXXXX219 |

Below are the steps for migration/masking of the data from the two flat files to the SQL database environment and the system 10 will automatically maintain referential integrity. Using the user interface of the communication module 201, the user will provide the identification of the data source file(s) 202 as well as the identification of the destination or output data file(s) 209. In this example, no application source code 210 is not scanned/analyzed by the referential integrity logic 203 to determine business rules and thus also referential integrity, since the RI relationship is defined already, as described above. Here, in this example, the data source file(s) 202, i.e., the source data comprises the two flat files, viz., the "User Details" and "Rewards Redemption" Tables 10-11.

In addition, the destination or output data file(s) 209 are as follows, i.e., the destination data file(s) 209 comprise the SQL Server Name and Database Name along with valid credentials (i.e., enough information in order to connect to the SQL database).

The logical referential integrity module 203 will connect with the data source 202, i.e., the two flat files named "User Details" and "Rewards Redemption" using a suitable connector, such as the System.IO connector in a .NET embodiment. The logical referential integrity module 203 is further configured to scan all the columns to update the data store associated with the configuration engine 207.

Table 12 below illustrates a configuration (e.g., in XML format in an embodiment) included in the data store associated with and by the configuration engine 207 for the column named "User ID". Similar configuration(s) will be stored/included in the data store associated with the configuration engine 207 for all other columns scanned by the logical referential integrity module 203.

TABLE 12

```
<Column>
    <UniqueID>f9059a31-92a2-4d65-2349-0923611o923pg</UniqueID>
    <Name>User ID</Name>
    <IsSelected>true</IsSelected>
    <Source>User Details</Source>
```

TABLE 12-continued

```
    <IsPrimaryKey>True</IsPrimaryKey>
    <IsForegienKey>false</IsForegienKey>
    <OrdinalPosition>0</OrdinalPosition>
    <IsNullable>false</IsNullable>
    <DataType>string</DataType>
    <CharacterMaxLength>0</CharacterMaxLength>
    <TableName>shiporder</TableName>
    <IsMigrationKey>false</IsMigrationKey>
    <PrefixLengthForMasking>0</PrefixLengthForMasking>
</Column>
```

The logical referential integrity module 203 will also create a referential integrity automatically using the "User ID" column, as this column (with same name) is also present in both the flat files. The data store associated with the configuration engine 207 is further updated accordingly as illustrated in Table 13 (i.e., to include the above-mentioned referential integrity with comes in the form of a "Constraint" in the XML configuration snippet of Table 13).

TABLE 13

```
<Constraint>
    <UniqueID>98Djo67zz-49fd-4230-8c67-09543fflm78z</UniqueID>
    <Name>User ID</Name>
    <IsSelected>true</IsSelected>
    <IsManuallyAdded>false</IsManuallyAdded>
    <ConstraintType>PRIMARY_KEY_CONSTRAINT</ConstraintType>
    <OrdinalPosition>1</OrdinalPosition>
    <TableUniqueID>09ffol87h-bb03-6321-21de-nd65wq8730
    </TableUniqueID>
    <TableName>User Details</TableName>
    <ColumnUniqueID>b4810efc-04a2-41fc-9eac-b64536f95cb9
    </ColumnUniqueID>
    <ColumnName>CustomerID</ColumnName>
    <DiaplayName> CustomerID </DiaplayName>
</Constraint>
```

As we need to create new tables in the SQL database, there will be no user-defined mapping between the source and the destination file(s) acquired using the UI of the communication module 201. The entity/data map module 204 will scan all the columns in the data source file(s) 202 and will create a mapping automatically that will result in the creation of the destination columns in the destination or output data file(s) 209 with same names as in the data source file(s) 202. The entity/data map module 204 will accordingly update the data store associated with the configuration engine 207 as illustrated in Table 14 below (i.e., again, by creation and insertion of an XML snippet, in an embodiment).

TABLE 14

```
<Column>
    <UniqueID>ce0514c8-154a-46a9-8fac-d5b653ceb582</UniqueID>
    <Name>User Name </Name>
    <Destination>User Details</Destination>
    <DestiColumnName>User Name</DestiColumnName >
```

TABLE 14-continued

```
<IsSelected>true</IsSelected>
<IsPrimaryKey>false</IsPrimaryKey>
<IsForegienKey>false</IsForegienKey>
<OrdinalPosition>2</OrdinalPosition>
```

Using the communication module 201, the user may apply "Tokenization" masking (i.e., where a random value replaces the current value) on the "User ID" column in order to maintain confidentiality. There is no rule applied (i.e., filter rule), as we want to migrate all the data from the data source file(s) 202. The customized/masking rules module 205 will scan the applied masking and update the data store associated with the configuration engine 207, as illustrated in Table 15 (again, in the form of an XML snippet, in an embodiment).

TABLE 15

```
<Column>
    <UniqueID>86eedcda-5b9d-44c0-b2a4-486307abfa68</UniqueID>
    <Name>User ID</Name>
    <IsSelected>true</IsSelected>
    <IsPrimaryKey>false</IsPrimaryKey>
    <IsForegienKey>false</IsForegienKey>
    <OrdinalPosition>9</OrdinalPosition>
    <Default />
    <IsNullable>true</IsNullable>
    <DataType>nvarchar</DataType>
    <IsUpdatedDataType>false</IsUpdatedDataType>
    <CharacterMaxLength>100</CharacterMaxLength>
    <TableName>User Details</TableName>
    <MaskingType>Tokenization</MaskingType>
    <IsMigrationKey>false</IsMigrationKey>
</Column>
```

According to the referential integrity set by the logical referential integrity module 203 and one or more configurations in the data store associated with the configuration engine 207, the sequence engine 206 will build a tree view that illustrates the sequence of migration. The "User Details" table will be created first as it has the primary key constraint, i.e., the User ID primary key. Accordingly, the sequence engine 206 will update the data store associated with the configuration engine 207, as illustrated in Table 16 (again, in the form of an XML snippet, in an embodiment).

TABLE 16

```
<Table>
    <UniqueID>k219da-mn89-4a28-zac2-71tq98v08k</UniqueID>
    <Name>User Details</Name>
    <IsSelected>true</IsSelected>
    <SortOrder>1</SortOrder>
    <ServerUniqueID>1b0f4bfd-1a28-4e71-adf4-548dd93368de</ServerUniqueID>
</Table>
```

The execution engine 208 will take inputs from the data store associated with the configuration engine 207, i.e., the outcomes of the operation of the logical referential integrity module 203, the entity/data map module 204, the customized/masking rules module 205, and the sequence engine 206 and automatically create scripts. These same scripts will be then executed by the execution engine 208 that will result in the migration of the schema first, i.e., it creates new tables and columns in the destination or output data file(s) 209. The Table names in the destination or output data file(s) 209 will therefore match the respective flat file names. Column names will also match the columns in the data source file(s) 202 as set by the entity/data map module 204. Once the schema is migrated, the data will be migrated/masked accordingly to the destination or output data file(s) 209, as illustrated in Tables 17-18.

TABLE 17

("User Details" SQL Table)

| User ID | User Name | Tax-SSN | DOB | Gender | Phone Number |
|---|---|---|---|---|---|
| 25852 | Ale J Wars | XXX-XX-2480 | Jun. 5, 1977 | Male | XXXXXXX365 |
| 15424 | Coli P Cars | XXX-XX-5093 | Jun. 4, 1983 | Female | XXXXXXX214 |
| 1041 | Willi Kunai | XXX-XX-4501 | Jun. 5, 1979 | Male | XXXXXXX219 |

TABLE 18

("Rewards Redemption" SQL Table)

| Redemption ID | User ID | Points Redeem | Product Order | SSN | City | Phone Number |
|---|---|---|---|---|---|---|
| 100052746854 | 25852 | 5 | Shop1 | XXX-XX-2480 | City1 | XXXXXXX365 |
| 108579416873 | 15424 | 4 | Shop1 | XXX-XX-5093 | City2 | XXXXXXX214 |
| 187975848524 | 1041 | 7 | Shop1 | XXX-XX-4501 | City3 | XXXXXXX219 |

Figure 4:
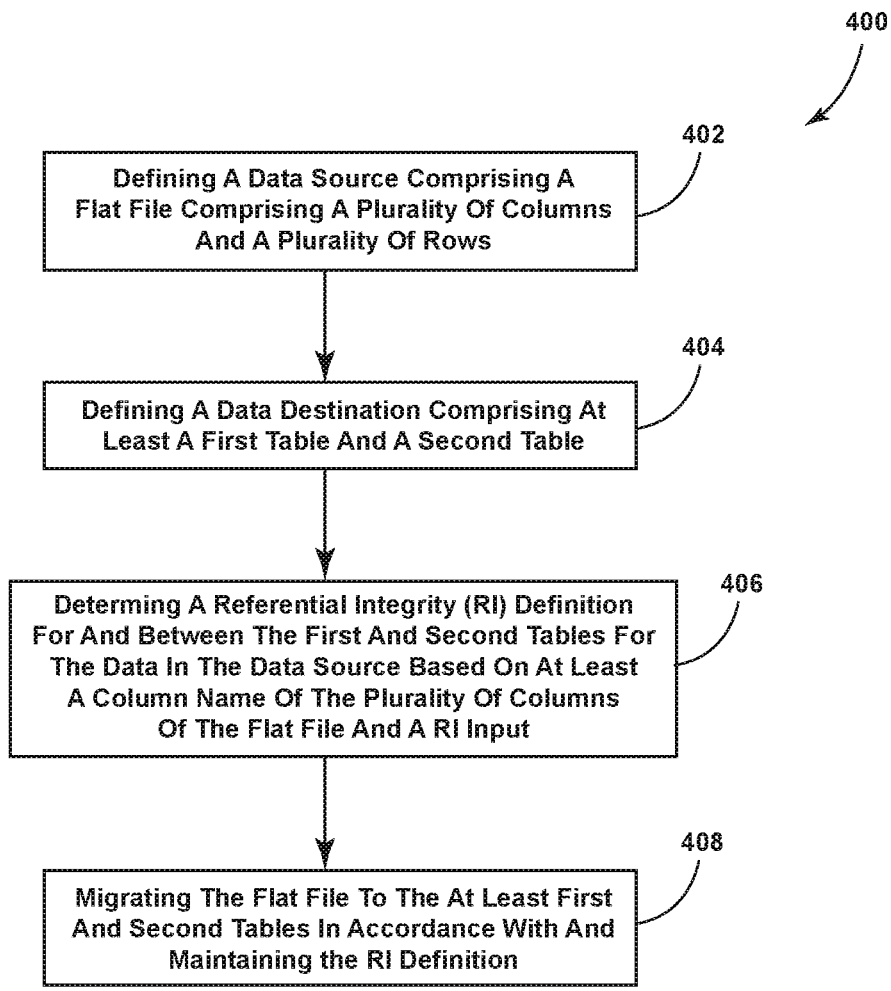
FIG. 4 is a simplified flowchart diagram illustrating a method of maintaining referential integrity in accordance with an embodiment.

FIG. 4 is a simplified flowchart showing a method 400 in accordance with an embodiment of the instant disclosure. The method begins in step 402.

Step 402, by way of the system 10 and logic module 32 (FIG. 1), involves defining a data source including a flat file comprising a plurality of columns and a plurality of rows. As described above, step 402 may be performed by way of the operation of the user interface (UI) of the communications module 201, which is configured to, in-part, obtain from a user an identification of one or more data source file(s) 202. In addition, step 402 may involve operation of the reverse engineer module 212, particularly the referential integrity module 203, in order to determine the columns of the data source 202. The method then proceeds to step 404.

Step 404, by way of the system 10 and logic module 32, involves defining a data destination comprising at least a first table and a second table. As described above, step 404 may be performed by way of the operation of the user interface (UI) of the communications module 201, which is configured to, in-part, obtain from the user an identification of one or more data destination file(s) 209 and optionally an identification of an application source code file 210 for scanning and analysis. As described above, the reverse engineer module 212, particularly the referential integrity module 203, is configured to determine, in-part, at least some of the characteristics of the data destination file(s) 209 (i.e., of the first and second tables). The method then proceeds to step 406.

Step 406, by way of the system 10 and logic module 32, involves determining a referential integrity (RI) definition for and between the first and second tables, for the data in the data source, based on at least a column name defined in the plurality of columns of the flat file as well as a referential integrity input. In an embodiment, as described above, the referential integrity module 203 determines the referential integrity (RI) relationship(s) as described above and then stores the RI relationships in the data store associated with the configuration engine 207. Determining the RI may be performed automatically as described above (e.g., in the case of where the column names matching), may be performed by analyzing the application source code 210 for one or more embedded business rules that define an RI, and/or may be user-defined RI as collected from the user by way of the UI of the communication module 201. In any event, in an embodiment, the RI relationship so determined is stored in the data store of the configuration engine 207. The method then proceeds to step 408.

Step 408, by way of the system 10 and logic module 32, involves migrating the flat file to the at least first and second tables (of the data destination) in accordance with and maintaining the above-referenced RI definition.

It should be further understood that an electronic processor configured execute the flat file migration logic as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

It should be further still understood that an article of manufacture in accordance with this disclosure includes a computer-readable storage medium having a computer program encoded thereon for implementing the flat file migration logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A method comprising:
    defining a data source comprising a flat file comprising a plurality of columns and a plurality of rows;
    defining a data destination comprising at least a first table and a second table;
    determining a referential integrity (RI) definition for and between the first and second tables based on at least a column name of the plurality of columns of the flat file and a referential integrity input, by scanning an application source code associated with the data source to identify one or more data rules associated with the at least column name wherein said one or more data rules comprises the RI definition; and
    migrating the flat file to the at least first and second tables in accordance with and maintaining the RI definition.

2. The method of claim 1 wherein determining the RI definition comprises:
    providing a user interface configured to receive the RI definition from a user.

3. The method of claim 1 wherein the flat file is a first flat file comprising a first plurality of columns with a first data header identifying first column names, and wherein defining the data source further comprises a second flat file comprising a second plurality of columns with a second data header identifying second column names, and wherein determining the RI definition comprises:
    reading the first and second data headers to obtain respective sets of first column names and second column names;
    matching at least one column name in the first set of column names with at least one column name in the second set of column names; and
    defining the at least one matched column name as a primary key in the first table and a foreign key in the second table.

4. The method of claim 1 wherein said migrating further comprises masking columns.

5. The method of claim 4 wherein masking comprises masking values contained in at least one column of said plurality of columns of said flat file in accordance with a predetermined masking strategy.

6. The method of claim 5 wherein said predetermined masking strategy comprises irreversible masking.

7. The method of claim 6 wherein said irreversible masking comprises modifying values contained in the at least one column.

8. The method of claim 6 wherein said predetermined masking strategy comprises reversible masking.

9. The method of claim 8 wherein said reversible masking comprising encryption of values contained in the at least one column.

10. The method of claim 4 wherein migrating further comprises applying a filter to select one or more columns from the plurality of columns in the data source flat file for migration to the data destination.

11. The method of claim 10 wherein the selected one or more columns is less than a total number of the plurality of columns.

12. The method of claim 10 further comprising:
providing a user interface configured to receive a condition to define the filter.

13. The method of claim 1 wherein said data destination comprises a plurality of flat files.

14. The method of claim 1, wherein the first and second tables of the data destination are included in a relational database management system (RDBMS).

15. The method of claim 1 further comprising, after said determining:
providing a user interface configured to receive from a user a mapping strategy that maps the plurality of columns of the flat file to respective columns of the data destination.

16. The method of claim 1 wherein said data store comprises an extensible markup language (XML) data file.

* * * * *